United States Patent
Masterson

(10) Patent No.: US 6,370,811 B1
(45) Date of Patent: Apr. 16, 2002

(54) APPARATUS AND METHOD FOR MONITORING TERMITE ACTIVITY

(76) Inventor: Michael J. Masterson, 19601 Covina Hills Rd., Covina, CA (US) 91724

(*) Notice: Subject to any disclaimer, the term of this patent is extended or adjusted under 35 U.S.C. 154(b) by 0 days.

(21) Appl. No.: 09/628,463

(22) Filed: Jul. 31, 2000

(51) Int. Cl.[7] ............................................... A01M 1/10
(52) U.S. Cl. ..................... 43/121; 43/124; 43/132.1; 43/131; 340/693; 340/573.1
(58) Field of Search ..................... 43/121, 124, 132.1

(56) References Cited

U.S. PATENT DOCUMENTS

| | | | |
|---|---|---|---|
| 3,564,750 A | | 2/1971 | Burgess |
| 5,329,726 A | | 7/1994 | Thorne et al. |
| 5,575,105 A | | 11/1996 | Otomo |
| 5,592,774 A | | 1/1997 | Galyon |
| 5,899,018 A | | 5/1999 | Gordon et al. |
| 5,901,496 A | | 5/1999 | Woodruff |
| 6,016,625 A | * | 1/2000 | Bishoff et al. ................ 43/121 |
| 6,065,241 A | * | 5/2000 | Woodruff ................... 43/132.1 |
| 6,100,805 A | * | 8/2000 | Lake ....................... 340/573.1 |
| 6,158,166 A | * | 12/2000 | Snell et al. .................... 43/131 |
| 6,189,393 B1 | * | 2/2001 | Cates ........................ 73/865.8 |
| 6,219,960 B1 | * | 4/2001 | Contadini et al. ............ 43/121 |
| 6,255,959 B1 | * | 7/2001 | Lake et al. .................. 340/693 |
| 6,266,918 B1 | * | 7/2001 | Henderson et al. ........... 43/131 |

OTHER PUBLICATIONS

"Systematic Termite Control™" brochure; FMC Corporation; 7/99; 2 pp.
"Termatrol Pro" brochure; Sector Diagnostics, LLC; no date; 2 pp.
"Quarterra Extended Inspection Interval Station" brochure; Ensystex; no date; 2 pp.

* cited by examiner

Primary Examiner—Peter M. Poon
Assistant Examiner—Bethany L Griles
(74) Attorney, Agent, or Firm—Sheldon & Mak

(57) ABSTRACT

Apparatus, for detecting the presence and eating activity of organisms such as termites that damage structures, includes a body; a wooden bait element controllably exposed to the organisms within a cavity of the body, and having an applied bait substance; a side wall of the body having a vertically spaced plurality of smoothly converging entrance passages for admitting the organisms, a consumable porous barrier covering each of the entrance passages. Spring tension is applied to an upper end of the bait element, an opposite end being anchored to the body. A flag member that is connected to the upper end of the bait element projects from the body when the bait element is weakened to the predetermined amount by the organisms.

22 Claims, 2 Drawing Sheets

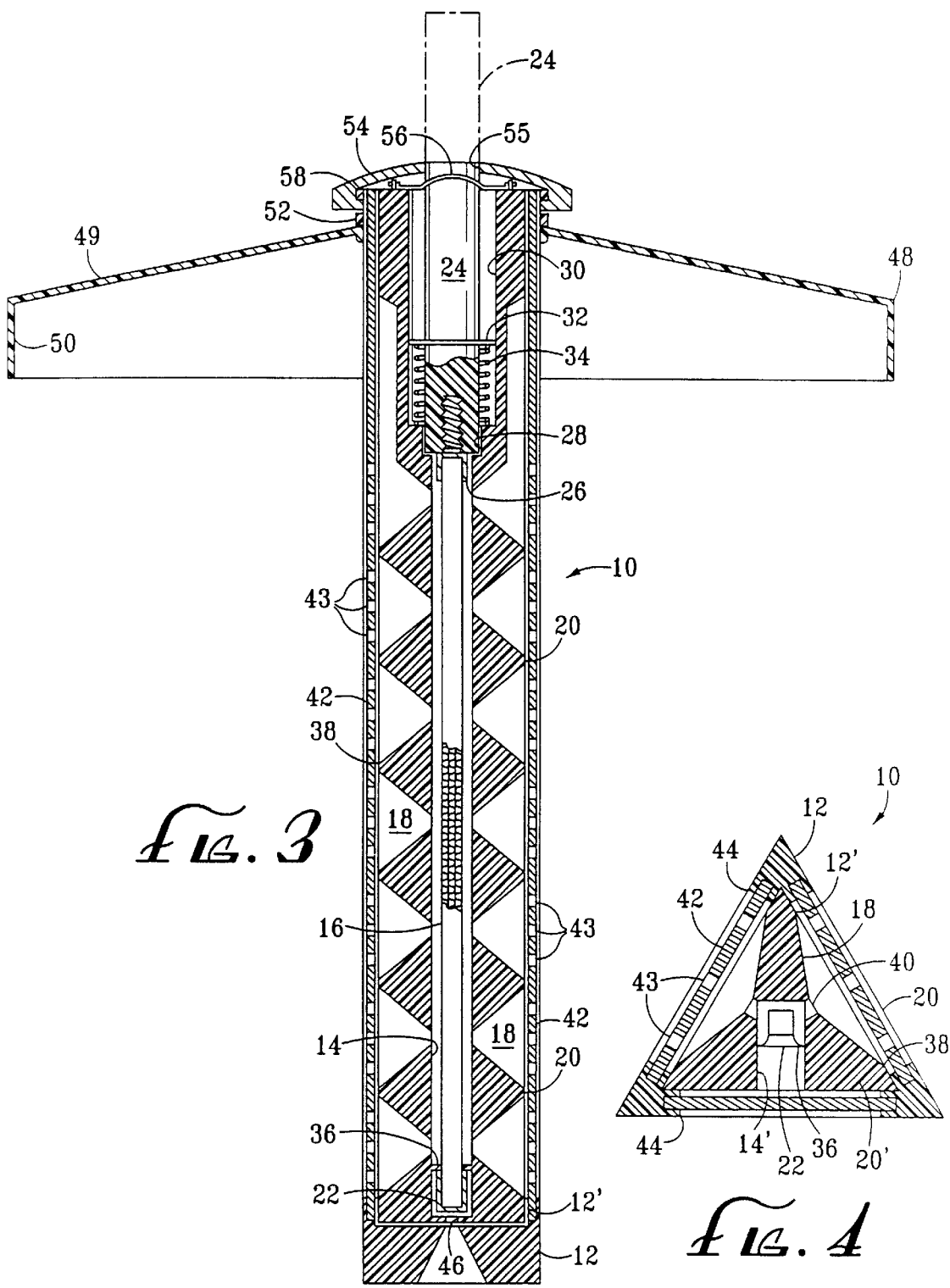

APPARATUS AND METHOD FOR MONITORING TERMITE ACTIVITY

BACKGROUND

The present invention relates to pest control, and more particularly to monitoring termite activity proximate and especially under building structures.

Termite infestation and damage is a continuing problem in buildings having wood structure. Traditionally, the structures are inspected only infrequently, such as in connection with a sale, at which time considerable damage may have been done, with expensive repairs being required. Termite infestation and damage is generally not readily apparent, and partial dismantling of building structures in order to locate possible infestation has to be weighed against the damage done by such dismantling and the cost of restoration. Even professional inspections are not always effective with respect to inaccessible structure.

Accordingly, various non-invasive devices have been developed for detecting termite activity, such devices being implanted in the ground around and/or under homes or other building structures. For example, U.S. Pat. No. 5,329,726 to Thorne et al. and U.S. Pat. No. 5,901,496 to Woodruff disclose ground-implantable devices for detecting termite activity, the devices having a perforate outer housing for permanent ground implantation, and a removable perforate cartridge having bait therein. The cartridge is removed and visually inspected for detection of termite activity. These devices of the prior art exhibit a number of disadvantages; for example:

1. They are ineffective in that active termite infestations may be ignored because:
   a. the unit does not get proper inspections;
   b. the original placement of the unit is difficult to determine;
   c. an aggressive termite colony was not identified early; and
2. They are difficult to install and monitor, especially when implanted in crawl space under structures.

Thus there is a need for a device that facilitates detection and monitoring of infestation of soil environments of building structures by destructive organisms, that is both effective and easy to use, and that is inexpensive to provide.

SUMMARY

The present invention meets this need by providing a monitoring device having a direct indication of a predetermined amount of cumulative destructive activity of invasive organisms such as termites. In one aspect of the invention, an apparatus for signaling a cumulative amount of weakening of a test material resulting from exposure to a hazardous environment includes a body; a test element supported relative to the body and comprising the test material; means for controllably exposing the test element to the hazardous environment; means for applying a load force to the test element, the load force being effective for displacing a portion of the test element when there is a predetermined amount of weakening of the test element; a flag member movably supported relative to the body and coupled to the test element for movement in projecting relation to the body when the test element is weakened to the predetermined amount. The means for controllably exposing can include the body having a cavity for enclosing the test element, a side wall of the body having an opening therein for communicating with the hazardous environment. As used herein "hazardous environment" means an environment that may be deleterious to the strength of a structural material.

In another aspect of the invention, an apparatus for detecting the presence and eating activity of organisms that damage structures by consuming portions thereof includes the body; a bait element supported relative to the body and comprising a consumable structural material; means for controllably exposing the bait element to the organisms; means for applying a load force to the bait element, the load force being effective for displacing a portion of the bait element when there is a predetermined amount of weakening of the bait element; a flag member movably supported relative to the body and coupled to the bait element for movement in projecting relation to the body when the bait element is weakened to the predetermined amount by the organisms.

The exposing means can include the body having a cavity for enclosing the bait element, a side wall of the body having an entrance passage formed therein for admitting the organisms. Preferably the exposing means further includes a barrier member covering the entrance passage and being formed of a sheet of consumable porous material for excluding foreign material from the entrance passage. The consumable material of the barrier member is preferably perforated for enhanced communication of bait odor out of and of the organisms into the entrance passage. The barrier member can also act as an attractant, being selected, for example, from the group consisting of balsa wood, pine, and cardboard. Preferably the body has an outer portion to which the sheet of consumable porous material is connected and a telescopically separable core portion that supports the bait element and the flag member for facilitating removal and inspection of the bait element without disturbing the outer body and the sheet of porous material.

The entrance passage can extend between a first opening in an outside surface of the side wall and a second opening in an inside surface of the side wall, the first opening having a first area, the second opening having a second area being preferably less than the first area, the passage smoothly tapering between the first area and the second area for concentrating eating activity at a specific location along the bait element. The body can form an elongate housing having respective bottom and top extremities, the entrance passage being preferably one of a vertically spaced plurality of entrance passages for exposure to organisms at plural depths within the hazardous environment, a consumable porous barrier member covering each of the entrance passages. The entrance passages and the barrier member can be on a first fade of the body, the body preferably including a second face having counterparts of the entrance passages and the barrier member for exposing the bait element to organisms approaching from different directions.

The means for applying a load force can include a first coupling for anchoring one end to the bait element to the body, a second coupling for connecting an opposite end of the bait element, and a spring for applying tensile load to the bait element through the second coupling. The flag member can be connected to the second coupling. The bait element can be a wood member having a bait substance applied thereto.

In a further aspect of the invention, a method for monitoring a predetermined cumulative eating activity of organisms on a bait member includes:

(a) providing a housing body having an elongate cavity and a side wall passage;
(b) anchoring one end of the bait member to the body with the bait member extending within the cavity;
(c) connecting a flag member to an opposite end of the bait member with the flag member extending to proximate a flag opening of the body;

(d) connecting a spring member between the flag member and the housing body for tensioning the bait member;

(e) placing the housing body in a medium subject to infestation by the organisms with the side wall passage being accessible by the organisms and the flag opening being located outside the medium; and (f) periodically observing the housing body for display to the flag member in an extended position thereof.

The method can further include interposing a consumable porous barrier between the medium and the side wall passage for preventing the medium from contacting the bait member.

DRAWINGS

These and other features, aspects, and advantages of the present invention will become better understood with reference to the following description, appended claims, and accompanying drawings, where:

FIG. 3 is a lateral sectional view on line 3—3 of FIG. 1; and

FIG. 4 is a plan sectional view on line 4—4 of FIG. 1.

DESCRIPTION

Figure 1:
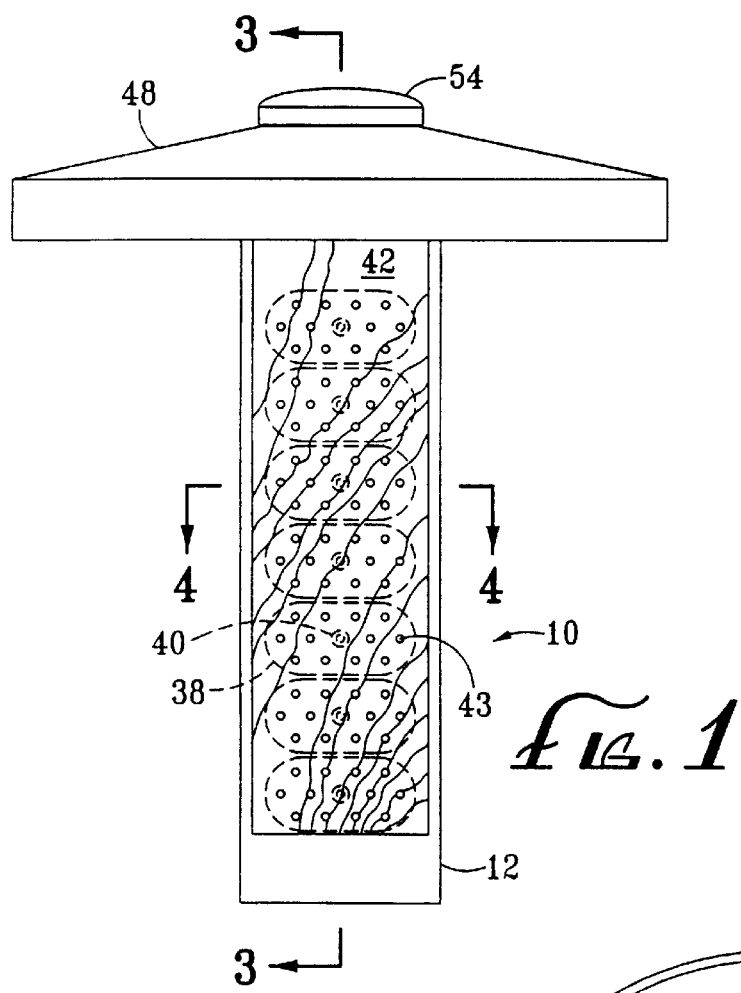
FIG. 1 is a side view of a termite monitoring apparatus according to the present invention.
Figure 2:
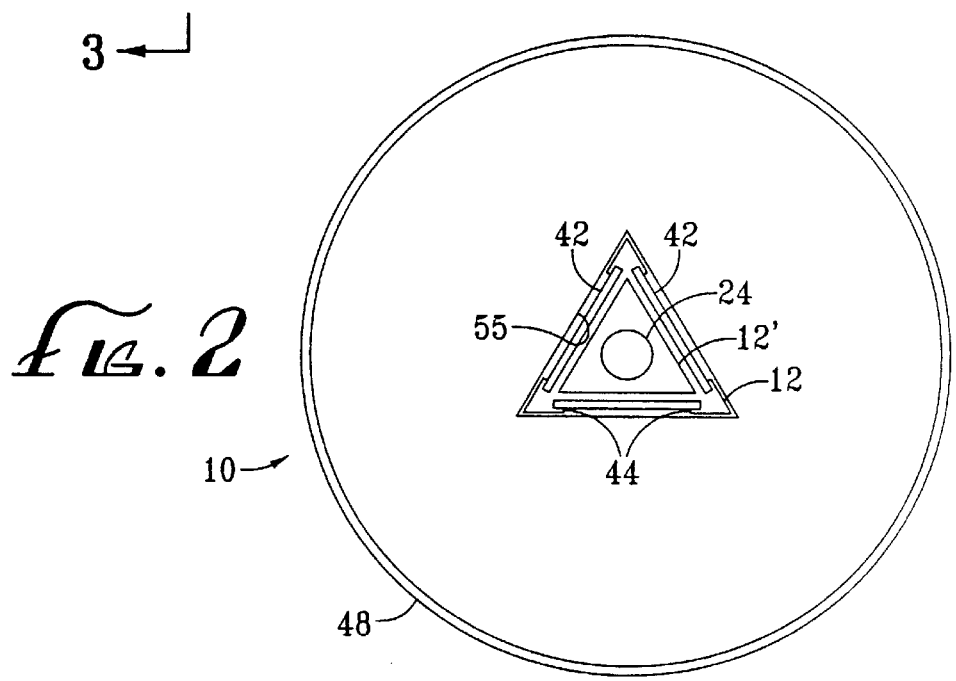
FIG. 2 is a top view of the apparatus of FIG. 1.

The present invention is directed to a device and method for detecting and monitoring the activity of invasive destructive organisms such as termites. With reference to FIGS. 1–4 of the drawings, a monitoring apparatus 10 includes a generally cylindrical housing body 12 having an elongate main cavity 14 for receiving a test element 16, a plurality of entrance passages 18 being formed in one or more side walls 20 of the body 12 for admitting the organisms (not shown). The test element 16 is typically in the form of a cardboard strip or rod, wooden rod or dowel, which can be impregnated or coated with a suitable attractant such as phermone, the element 16 thus also being sometimes referred to herein as a bait element. A stop member 22 is attached at a bottom extremity of the bait element 16 for anchoring engagement proximate a lower extremity of the main cavity 14. Also, a flag member 24 is connected to a top extremity of the bait element 16 by a flag fitting 26, the flag member 24 being axially movable from a first position as shown by solid lines to a second position as shown by broken lines in FIG. 3. The flag member 24 extends within a flag cavity 28 that forms an enlargement of the main cavity 14, the cavity 28 extending to the top of the housing body 12. An upper portion of the flag cavity 28 is enlarged, forming a spring cavity 30 for accommodating a stop ring 32 that projects laterally from the flag member, and a compression spring 34 that is interposed between the stop ring and a bottom extremity of the spring cavity 30 for biasing the flag member toward the second position thereof, the stop ring 32 abutting a main cap 54 (further described below) that forms an upper extremity of the spring cavity 30 in the second position of the flag member 24. Thus, when a predetermined amount of weakening of the test element 16 occurs, the element fractures in tension, whereupon the flag member 24 snaps to the second position thereof in projecting relation to the housing body 12, being viewable from a distance as a direct indication of the corresponding cumulative consumption of the element 16.

The stop member 22 and the flag fitting 26 can be attached to the test element 16 by any suitable means, such as by an adhesive, and/or by a coupling pin (not shown) that projects laterally through the element 16 and opposite walls of the stop member (and the flag fitting). As shown in FIG. 3, the stop member 22 is retained against upward movement by an anchor ledge 36 that projects inwardly within the main cavity 14 of the body 12.

A preferred configuration of the entrance passages 18 has each passage formed with a large outwardly facing first opening 38 and a much smaller second opening 40 into the main cavity 14, the passage 18 being smoothly inwardly tapered from a first area corresponding to the first opening 38 to a second area corresponding to the second opening 40 for focusing invasive activity at a particular location along the test element 16.

A principal feature of the present invention is that each entrance passage 18 is covered by a porous barrier member 42 that is easily consumed by invasive organisms seeking access to the bait element 16 after the apparatus 10 is imbedded in soil that may contain the organisms. Thus the first openings 38 of the entrance passages 18 can be quite large without being blocked by pebbles or clods of the soil. More particularly, it is expected that the invading organisms will not entirely consume the portions of the barrier member 42 that cover the first openings 38, the barrier member being at least partially effective in excluding the soil particles from the entrance passages 18. Further, the soil particles that do get in the passages are likely to fall below the second openings 40 without blocking them. Moreover, the enhanced area of the first openings 38 serves to enable the passage of gaseous attractant matter through the porous barrier member 42 at a rate at least as great as that permitted by the smaller area of the second openings 40. As shown in FIG. 1, each of the first openings 38 can have a rounded rectangular of other non-circular shape for more fully utilizing the area of the side walls 20 of the body 12. Further, the barrier members are preferably perforated as indicated at 43 for enhanced communication of gaseous attractant into the soil, and for facilitating entry of termites or other invasive organisms. As best shown in FIG. 4, the barrier members 42 are retained in respective side walls 20 of the body 12 by pairs of flange portions 44, the barrier members being inserted (or removed for replacement) from the top of the body 12.

A drain opening 46 is provided at the bottom of the main cavity 14 as shown in FIG. 3 for draining moisture that might otherwise accumulate therein, the opening 46 being recessed above a bottom extremity of the housing body 12 for spacing soil therefrom when the apparatus 10 is in use. Moisture released into the soil from the opening 46 creates an environment that is attractive to termites. As shown in FIG. 4, at least a lower portion of the main cavity 12 optionally extends laterally as indicated at 12' by a sufficient distance from the anchor ledge 36 for allowing the test element having the stop member 22 thereon to be lowered through the flag cavity 28 into the main cavity 14, and moved laterally into engagement with the anchor ledge 36, the anchor ledge 36 being open toward the enlarged cavity portion 12'.

Preferably the second openings 40 of the entrance passages 18 in respective side walls 20 of the body 12 are at corresponding locations along the test element 16 for further concentrating invasive activity at those locations, thereby further accelerating fracture of the test element 16 to more effectively and repeatably indicate a degree of infestation as the predetermined weakening of the test element 16.

The apparatus 10 also includes a skirt member 48 for facilitating imbedded placement of the housing body 12 vertically oriented and at a desired depth in soil. The skirt member also collects condensation, which typically occurs between the soil and the skirt-member. The skirt member 48 is generally circular, having an outwardly and downwardly extending main portion 49 for directing the condensation away from the housing body 12, and a downwardly projecting flange portion 50 for imparting stiffness to the skirt member, which is also formed with a central opening for passage of an upper portion of the housing body 12. The outwardly directed condensation advantageously creates an enlarged moisture barrier around the housing 12, thereby enhancing the attraction of termite activity to the monitor apparatus 10.

The body 12 is formed with an outwardly projecting skirt lip 52 which rests on the skirt member 48, the skirt member resting on the ground and being retained on the body 12 against the lip 52 by the weight of the body 12 and the other components of the apparatus 10. A main cap 54 covers the top of the body 12 and the barrier members 42 for shedding moisture that might fall on the apparatus 10, the main cap 54 having a central opening 55 for exposing the flag cavity 28, the flag member 24 extending partway through the opening 55 in the first position thereof. The main cap is upwardly convex for enhancing the shedding of moisture, and for smoothly deflecting passing objects such as lawnmowers and the like that may be used in the vicinity of the apparatus 10. The flag member 24 is exposed by extending through the main opening 55 in the second position thereof, upward movement of the flag member being limited by the stop ring 32 contacting the underside of the main cap 55. In the exemplary configuration of the apparatus 10 as shown in the drawings, the housing body 12 is generally triangular in cross-section. Of course, there can be other numbers of the side walls 20, with square and other polygonal cross-sectional shapes being contemplated.

Preferably the housing body 12 is separable, including a core portion 12' that holds the test element 16 together with the flag member 24 and its associated hardware, the designation 12 pertaining to an outer body portion having the flange portions 44 and the lip 52 formed thereon. As shown in FIGS. 3 and 4, the first openings 38 are formed in the core portion 12'. Also, a bail member 56 is pivotally connected at the top of the core portion 12' for facilitating removal thereof axially from the top of the body 12 when the main cap 54 is removed, the cap 54 having snap-engagement with a cap lip 58 that is spaced above the skirt lip 52 on the outer body 12. Thus the core portion 12' can be removed from the main body portion 12 and inspected without disturbing either the body 12 or the barrier members 42 that are retained thereby. As further shown in FIG. 4, the enlarged cavity potion 14' can extend through a side wall 20' of the core portion 12', the side wall 20' not having the vertically spaced entrance passages 18 formed therein. However, the main body portion 12 is provided with counterparts of the flange portions 44 and the barrier member 42 facing the side wall 20'. In the alternative of the housing body 12 having the core portion 12' being integrally formed, the enlarged cavity portion 14' can be open to the outside, being covered by one of the barrier members 42.

Although the present invention has been described in considerable detail with reference to certain preferred versions thereof, other versions are possible. For example, The housing body 12 can have a generally circular cross-section, a single tubular member being substituted for the barrier members 42. Also, the stop member 22 can be configured for snap-engagement with the anchor ledge 36, the body 12 being formed without the enlarged cavity portion 14'. Therefore, the spirit and scope of the appended claims should not necessarily be limited to the description of the preferred versions contained herein.

What is claimed is:

1. Apparatus for signaling a cumulative amount of weakening of a test material resulting from exposure to a hazardous environment, comprising:
   (a) a body;
   (b) a test element supported relative to the body and comprising the test material;
   (c) means for controllably exposing the test element to the hazardous environment;
   (d) means for applying a load force to the test element, the load force being effective for displacing a portion of the test element when there is a predetermined amount of weakening of the test element;
   (e) a flag member movably supported relative to the body and coupled to the test element for movement in projecting relation to the body when the test element is weakened to the predetermined amount.

2. The apparatus of claim 1, wherein the means for controllably exposing comprises the body having a cavity for enclosing the test element, a side wall of the body having an opening therein for communicating with the hazardous environment.

3. Apparatus for detecting the presence and eating activity of organisms that damage structures by consuming portions thereof, the apparatus comprising:
   (a) a body;
   (b) a bait element supported relative to the body and comprising a consumable structural material;
   (c) means for controllably exposing the bait element to the organisms;
   (d) means for applying a load force to the bait element, the load force being effective for displacing a portion of the bait element when there is a predetermined amount of weakening of the bait element;
   (e) a flag member movably supported relative to the body and coupled to the bait element for movement in projecting relation to the body when the bait element is weakened to the predetermined amount by the organisms.

4. The apparatus of claim 3, wherein the exposing means comprises the body having a cavity for enclosing the bait element, a side wall of the body having an entrance passage formed therein for admitting the organisms.

5. The apparatus of claim 4, wherein the exposing means further comprises a barrier member covering the entrance passage, the barrier member being formed of a sheet of consumable porous material.

6. The apparatus of claim 5, wherein the sheet of consumable porous material is perforated for enhancing communication with the entrance passage.

7. The apparatus of claim 5, wherein the consumable material of the barrier member is selected from the group consisting of balsa wood, pine, and cardboard.

8. The apparatus of claim 5, wherein the body comprises an outer portion and a telescopically separable core portion, the bait element and the flag member being supported within the core portion, the sheet of consumable porous material being connected to the outer portion.

9. The apparatus of claim 4, wherein the entrance passage extends between a first opening in an outwardly facing surface of the side wall and a second opening in an inwardly facing surface of the side wall, the first opening having a first area, the second opening having a second area being less than the first area, the passage smoothly tapering between the first area and the second area.

10. The apparatus of claim 4, wherein the body forms an elongate housing having respective bottom and top extremities, the entrance passage being one of a vertically spaced plurality of entrance passages, and a consumable porous barrier member covering each of the entrance passages.

11. The apparatus of claim 10, wherein the entrance passages and the barrier member are on a first face of the body, the body also including a second face having counterparts of the entrance passages and the barrier member.

12. The apparatus of claim 3, wherein the means for applying a load force comprises a first coupling for anchoring one end to the bait element to the body, a second coupling for connecting an opposite end of the bait element, and a spring for applying tensile load to the bait element through the second coupling.

13. The apparatus of claim 12, wherein the flag member is connected to the second coupling.

14. The apparatus of claim 3, wherein the bait element has a bait substance applied thereto.

15. The apparatus of claim 3, wherein the bait element is a wood member.

16. The apparatus of claim 3, wherein the bait element is a cardboard member.

17. A method for monitoring a predetermined cumulative eating activity of organisms on a bait member, comprising:
   (a) providing a housing body having an elongate cavity and a side wall passage;
   (b) anchoring one end of the bait member to the body with the bait member extending within the cavity;
   (c) connecting a flag member to an opposite end of the bait member with the flag member extending to proximate a flag opening of the body;
   (d) connecting a spring member between the flag member and the housing body for tensioning the bait member;
   (e) placing the housing body in a medium subject to infestation by the organisms with the side wall passage being accessible by the organisms and the flag opening being located outside the medium; and
   (f) periodically observing the housing body for display to the flag member in an extended position thereof.

18. The method of claim 17, further comprising interposing a consumable porous barrier between the medium and the side wall passage for preventing the medium from contacting the bait member.

19. Apparatus for detecting the presence and eating activity of organisms that damage structures by consuming portions thereof, the apparatus comprising:
   (a) a body forming an elongate housing having respective bottom and top extremities;
   (b) a bait element supported relative to the body and comprising a wood member having a bait substance applied thereto;
   (c) means for controllably exposing the bait element to the organisms, comprising the body having a cavity for enclosing the bait element, a side wall of the body having a vertically spaced plurality of entrance passages formed therein for admitting the organisms, the entrance passages extending between a first opening in an outside surface of the side wall and a second opening in an inside surface of the side wall, the first opening having a first area, the second opening having a second area being less than the first area, the passages smoothly tapering between the first area and the second area, a consumable porous barrier member covering each of the entrance passages, the entrance passages and the barrier member being on a first face of the body, the body also including a second face having counterparts of the entrance passages and the barrier member;
   (d) means for applying a load force to the bait element, comprising a first coupling for anchoring one end to the bait element to the body, a second coupling for connecting an opposite end of the bait element, and a spring for applying tensile load to the bait element through the second coupling, the load force being effective for displacing a portion of the bait element when there is a predetermined amount of weakening of the bait element;
   (e) a flag member movably supported relative to the body and connected to the second coupling for movement in projecting relation to the body when the bait element is weakened to the predetermined amount by the organisms.

20. The apparatus of claim 19, wherein the bait element has a bait substance applied thereto.

21. The apparatus of claim 19, wherein the bait element is a wood member.

22. The apparatus of claim 19, wherein the bait element is a cardboard member.

* * * * *